United States Patent

[11] 3,633,176

[72] Inventors Allan E. Lahrson Oakland; Frank E. Hublou, Richmond; Richard C. Zuchowski, San Francisco; Robert J. Vannucci, Concord; Timothy L. Lenox, San Leandro; David S. Geary, Oakland, all of Calif.

[21] Appl. No. 851,369
[22] Filed Aug. 19, 1969
[45] Patented Jan. 4, 1972
[73] Assignee Kaiser Aluminum & Chemical Corporation

[54] RECURSIVE KOPY PROGRAM FOR REMOTE INPUT MANAGEMENT SYSTEM
6 Claims, 1 Drawing Fig.

[52] U.S. Cl. .......... 340/172.5
[51] Int. Cl. .......... G06f 9/20
[50] Field of Search .......... 340/172.5; 235/157

[56] References Cited

UNITED STATES PATENTS

| | | | |
|---|---|---|---|
| 3,348,211 | 10/1967 | Ghiron .......... | 340/172.5 |
| 3,366,929 | 1/1968 | Mullery et al. .......... | 340/172.5 |
| 3,400,376 | 9/1968 | McDonnell .......... | 340/172.5 |
| 3,412,382 | 11/1968 | Coleur et al. .......... | 340/172.5 |

*Primary Examiner*—Raulfe B. Zache
*Assistant Examiner*—Sydney R. Chirlin
*Attorney*—Fulwider, Patton, Rieber, Lee & Utecht

ABSTRACT: A program and concept whereby a formatted file or limited size may be expanded to a size limited only by computer hardware. The program is written in ALGOL. It is part of a software system in a data processing system.

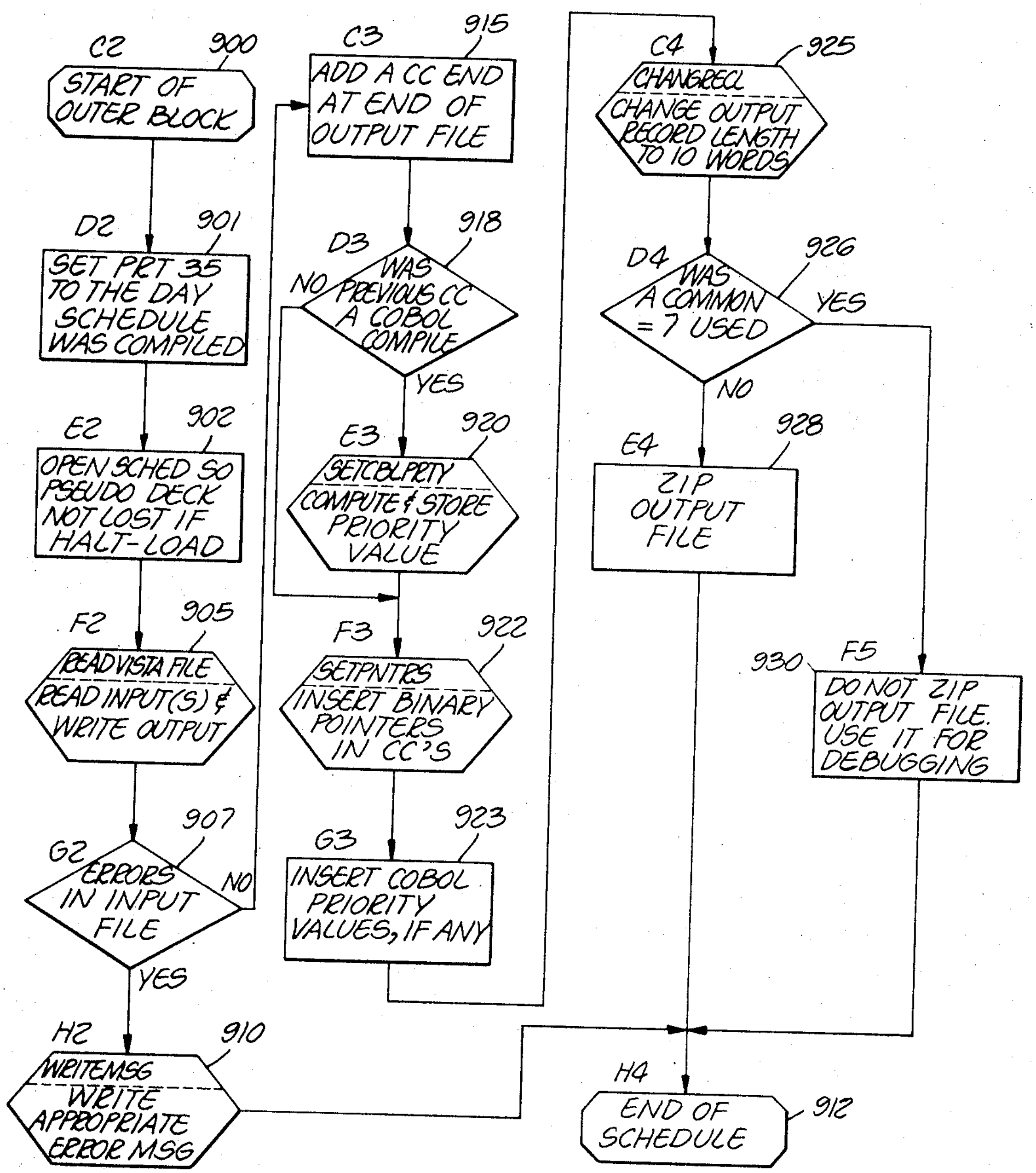
INVENTORS
ALLAN E. LAHRSON
FRANK E. HUBLOU
RICHARD C. ZUCHOWSKI
ROBERT J. VANNUCCI
TIMOTHY L. LENOX
DAVID S. GEARY
BY Fulwider, Patton, Rieber, Lee, and Utecht
ATTORNEYS

RECURSIVE KOPY PROGRAM FOR REMOTE INPUT MANAGEMENT SYSTEM

This invention relates to a method of programming a digital computer and, more particularly, to a method of controlling a digital computer to effectively enlarge a formatted data file of limited size.

Enlargement of a formatted data file is accomplished by resolution of Kopy statements in accordance with this invention. The Kopy statement, and the computer program associated therewith, causes the system to replace the data record containing the statement with all or part of the file named in the statement. The records which replace the Kopy statement do not become a permanent part of the file containing the statement. Any Kopy statement found in the second file may also Kopy all or a portion of a third file. In this way, a single file may be expanded to a nearly indefinite size.

Material essential to the understanding of this invention is found in the application entitled "Remote Input Management System," Ser. No. 851,242, filed Aug. 19, 1969, and now U.S. Pat. No. 3,585,601, which material is herein incorporated by reference and made a part of this application.

More specifically, reference is made to section VII of said application Ser. No. 851,242, entitled "SCHEDULE PROGRAM," including subsections 1, 2, 3, 4 and 5. Subsection 5, therein, contains the associated program source listing in ALGOL. The listing may be readily compiled by any compiler which will accept that language.

The drawing herein is the flow chart of the outer block of the schedule program. In addition, reference is made herein to FIGS. 24A, 24B, 25B and 26 in the above-cited patent for further disclosure herein.

What we claim is:

1. In a method of operating a digital computer in a network with one or more user's remote terminals, wherein a command entered at a terminal controls execution of an indexed file containing a program, the steps of controlling,

- a reading of portions of the indexing data in a first file identified by the command,
- a reading of data records referenced by said portions of indexing data,
- a determination of whether each data record read contains a statement requiring that the statement be replaced by data located in a different file,
- a replacement of said statement with the specified data located in said different file when said data record is determined to contain such a statement, and,
- a repetition of said replacement step each time a data record is read from any file and determined to contain said statement.

2. The method of claim 1, further comprising the step of controlling sequential storage of said read data records and associated indexing data and said replacement data from said different file.

3. The method of claim 2, wherein said step of controlling a reading of portions of the indexing data and associated data records comprises the steps of controlling

- a reading of a portion of said indexing data from the file named in the command into a storage device,
- a reading of the associated data records into said storage device, and,
- transferring of said portion of indexing data and associated data records into an output storage device.

4. The method of claim 2, wherein said step of controlling a determination of whether each data record read contains a statement requiring that the statement be replaced comprises the steps of controlling

- a determination of whether the previous data record read contained such a statement,
- if the answer to the prior determination is in the negative, a determination as to whether the replacement procedure is in progress, and,
- if the answer to the prior determination is in the negative, a determination of whether the record currently being read contains such a statement.

5. The method of claim 4, further comprising the step of controlling a determination of the number of such statements contained in currently read data records.

6. The method of claim 1, wherein said statement has the form of a command code followed by character strings which, if present, are identical to characters found in the beginning or ending portions of the data to be copied as replacement data and wherein said step of controlling replacement comprises the steps of controlling

- a determination of whether the data records corresponding to the beginning and ending portions of said statements have been found,
- if it is determined that they have not been found, a determination of which of said data records is being sought,
- if it is determined that the data record corresponding to the beginning portion is being sought, a determination of whether the data record currently being read contains an initial portion identical to the beginning portion, and,
- if it is determined that the data record corresponding to the ending portion is being sought, a determination of whether the data record containing an initial portion identical to the ending portion has been found.

* * * * *